United States Patent [19]
Huang et al.

[11] Patent Number: 5,897,220
[45] Date of Patent: *Apr. 27, 1999

[54] AUTOMATIC PHOTOGRAPH BOOTH FOR FORMING SKETCHES

[75] Inventors: Sming Huang, Monmouth, N.J.; Hiroyuki Hiraiwa, Tokyo, Japan

[73] Assignee: American Alpha Inc., Monmouth Junction, N.J.

[ * ] Notice: This patent is subject to a terminal disclaimer.

[21] Appl. No.: 08/984,999

[22] Filed: Dec. 4, 1997

Related U.S. Application Data

[63] Continuation-in-part of application No. 08/704,902, Aug. 30, 1996, Pat. No. 5,696,995.

[51] Int. Cl.⁶ .................................................. G03B 29/00
[52] U.S. Cl. ............................ 396/2; 396/429; 395/117; 348/552
[58] Field of Search .................................... 396/2, 3, 4, 5, 396/429; 395/106, 117; 348/722, 581, 582, 584, 586, 373, 552

[56] References Cited

U.S. PATENT DOCUMENTS

| | | |
|---|---|---|
| 4,677,460 | 6/1987 | Fass et al. ................................ 348/587 |
| 4,959,670 | 9/1990 | Thayer ......................................... 396/2 |
| 5,017,953 | 5/1991 | Biondo ......................................... 396/2 |
| 5,117,283 | 5/1992 | Kroos et al. .............................. 358/22 |
| 5,196,876 | 3/1993 | Thayer ......................................... 396/2 |
| 5,262,815 | 11/1993 | Aumiller ..................................... 396/2 |
| 5,343,386 | 8/1994 | Barber ...................................... 358/350 |
| 5,345,313 | 9/1994 | Blank ....................................... 348/598 |
| 5,436,694 | 7/1995 | Ishikawa et al. .......................... 355/75 |
| 5,446,515 | 8/1995 | Wolfe et al. ................................. 396/2 |
| 5,491,517 | 2/1996 | Kreitman et al. ........................ 348/581 |
| 5,500,700 | 3/1996 | Massarsky ................................... 396/2 |
| 5,530,793 | 6/1996 | Watkins et al. .......................... 395/117 |
| 5,577,179 | 11/1996 | Blank ....................................... 395/135 |
| 5,623,581 | 4/1997 | Attenberg ................................ 395/106 |
| 5,696,995 | 12/1997 | Huang et al. ................................ 396/2 |

*Primary Examiner*—Alan A. Mathews
*Attorney, Agent, or Firm*—John Lezdey & Assoc.

[57] ABSTRACT

The present invention teaches a computerized automatic photography booth for generating a synthesized sketch and a method therefor. The initial images to be converted may be real-time images taken on sight and/or stored images previously programmed into the memory of the computer. The computer maps out the essential characteristics of each image and converts the image into a sketch. Optionally, a background sketch is also programmed so as to form a composite.

5 Claims, 6 Drawing Sheets

5,897,220

AUTOMATIC PHOTOGRAPH BOOTH FOR FORMING SKETCHES

RELATED APPLICATION

This application is a continuation-in-part of application Ser. No. 08/704,902 filed on Aug. 30, 1996, now U.S. Pat No. 5,696,995.

BACKGROUND OF THE INVENTION

1. Field of the Invention

The present invention relates to automatic photograph booths, and more particularly, to an automatic photography booth containing a microprocessor and video camera for converting two or more images into one computer generated synthesized composite sketch.

2. Description of the Prior Art

There are presently known in the art coin or bill operated photo finishing booths which have fixed lens cameras therein and which take a series of photographs of an individual sitting in the booth. Such photographs are developed in the machine and then dispensed to the individual. However, the photographic capabilities of presently available machines is of poor quality, the photographs dispensed are exceptionally small and of poor lighting contrast, and the lens is fixed such that the individual cannot adjust the area to be encompassed in the photograph.

Automatic coin or bill operated photostudios, also known as "photographic vending machines," which are actuable by a user for taking self-portraits are well known in the prior art. Generally, these photostudios include a housing that is divided into a studio compartment where the user sits to be photographed and an adjoining apparatus compartment housing a portrait camera and associated film handling and processing equipment. Upon actuating the photostudio, usually by inserting a coin, bill or token into a receiving mechanism or by other means such as actuating an electrical switch, the camera operates to photograph the user sitting in the studio compartment and then the exposed film unit is automatically processed and delivered to the user, via a delivery chute or slot, in a relatively short period of time.

Automatic photostudios which utilize self-developing film units typically use film holding cassettes and a cassette changing apparatus for moving such cassettes into and out of operative relation with the camera. Generally, such cassette changing apparatuses include means for holding a supply of film cassettes and transfer means for moving a cassette from the supply means into a camera cassette receiving receptacle, removing the cassette from the receptacle after the film units therein have been expended, and replacing the removed empty cassette with a full cassette.

Self-serve photography booths typically have a still or video camera mounted in a booth wall opposite the user's seat. In some such systems, the wall with the camera mounted therein also has a video monitor for displaying the camera's image. The user is typically given a certain amount of time to position himself where desired within the camera's field of view before the image is captured and printed. Often, the user sits on a bench and if he needs to change the position of his image in the camera's field of view, he must shift his position up or down or side to side on the bench. Some such booths may have an adjustable height seat that gives the user control over the height of his image in the field of view.

In one such system, the platform to which the camera is mounted may be tipped on a horizontal axis by use of a motor-driven camera-mount platform to change the vertical field of view of the camera. This system provides adjustment only in the vertical direction; therefore, it does not allow the user to place his image everywhere within the camera's field of view. Furthermore, the camera movement is accomplished with a motor and pulley arrangement which is relatively expensive, complex and subject to breakdown and maintenance.

Moreover, there would of necessity be some time lag between the operator's use of the motor control button and the movement of the camera. Accordingly, it is relatively difficult and time consuming for the user to place his image where desired. Since these booths typically have a relatively short time, for example ten seconds, for the user to place himself where desired in the camera's field of view, this motor driven vertical positioning system will not provide the means by which the user can exactly place his image in the camera's field of view. This is a severe problem in such photography booths in which the user selects a stored image into which his image is placed digitally to provide a fantasized picture of the subject; in such instances, it is imperative that the subject be placed at exactly the right position and at the right angle, with the correct intensity of lighting and shading, to exactly fit in the stored image so that the resulting picture looks as realistic as possible.

More modern conventional photography booths include a video-photo installation that produces a photographic montage using a real-time image of a subject-user of the installation and a stored image selected by the subject-user. In such photography booths, a sensor registers the position of the subject-user and adjusts that position as needed. A control enables the installation to be controlled by the subject-user in accordance with instructions provided by the installation. The control may be executed by touch screen and communication with the user may be effected by audio/visual units that have multi-lingual capacity. Cosmetic features or messages may also be added to the image. The stored images may be replaced by reloading of a diskette. The advantage of such a system is that it is user-friendly and can superimpose one image on top of another image.

However, such a system does not have the ability to provide a sketch or a multiplicity of the sketch onto a substrate. Furthermore, the prior art systems do not superimpose a sketch of a user and a sketch of selected background to create a novel composite third sketch which is a hybrid of the first two sketches. Furthermore, there is a need for an improved camera operating system such that the subject-user need not concern himself or herself with posing in a certain position. The present invention teaches a system which includes these features as well as other improvements over the prior art. The term "sketch" as herein employed is understood to mean a representation of the real time image, such as a digital image and the like.

SUMMARY OF THE INVENTION

The present invention discloses an apparatus for and method of converting two or more photographic images into at least one computer generated synthesized composite sketch. The apparatus is a microprocessor-aided automatic photography booth which synthesizes, records and prints out the composite sketch as a single sketch or a multiplicity of the sketch onto a single card substrate. The booth includes an automatic photography system which contains a microprocessor interconnected to the following elements:

(a) a housing comprising an apparatus compartment and an adjoining studio compartment; the studio compartment has at least one opening for providing ingress and egress therein;

(b) a video camera mounted within the housing for receiving at least one real-time image of at least one subject-user; the camera has circuitry connected to the microprocessor for operating the photographic functions thereof and for receiving the real-time image; the microprocessor contains a memory having a plurality of stored images and a software program for converting at least one of the images into a composite sketch;

(c) means for automatically positioning an image of the subject-user inside a lens of said camera;

(d) a video display monitor associated with the camera and interconnected to the microprocessor for visually representing the real-time image, the stored image and the composite sketched image;

(e) actuating means positioned in the studio compartment for enabling the subject-user to start operation of the booth; and (f) control means positioned in the studio compartment and operably connected to the microprocessor for enabling the subject-user to control operation thereof; the control means is adapted for actuation by the subject-user to select one or more of the stored images for display on the monitor and to effect operation of the camera to focus upon the subject-user to obtain the real-time image; the control means is further adapted upon the command of the subject-user to fix the selected real-time image and to effect operation of the microprocessor to produce the composite sketch.

Preferably, the booth further includes means for instructing and informing the subject-user how to use the controls, means for recording and printing the composite sketch, a main control board which coordinates the operation of the booth, and a couple of one way mirrors which are positioned to direct the reflection of the images received to and from the camera, monitor and subject-user.

The sketches which are stored preferably include humans, animals, geographical sights and works of art. Similarly, one could have a sketch showing himself or herself standing in a sketch of the ruins in Rome, Italy or in some other historical sight or replacing a sketch of the face of the Mona Lisa or some other great work of art. There are a limitless number of combinations from which to choose.

Furthermore, the invention advantageously teaches alternative camera systems which minimize and even eliminate the participation of the subject-user in framing the resulting sketch.

Accordingly, it is an object of this invention to provide an improved automatic photography booth that can produce a sketch rather than a photo image.

It is a further object of this invention to provide a computer with a photography booth for improving accuracy and efficiency and for offering more options to the subject-user.

It is still a further object of this invention to provide a computer with a photography booth having a multiplicity of stored images for mapping out characteristics of each image taken or stored and for blending, merging or superimposing two or more such images into a new composite sketch.

It is another object of this invention to provide a camera system which is more efficient and easier to use and repair.

It is also another object of this invention to provide a camera system which minimizes or eliminates the need for the subject-user to properly position himself in the photography booth.

It is yet still another object of this invention to provide an improved photography booth of moderate size and cost that fits easily in retail locations, attracts customers and viewers and directly contributes to profits.

These and other objects and advantages of the present invention will become evident by referring to the following description and claims taken in conjunction with the accompanying drawings.

DETAILED DESCRIPTION OF THE PREFERRED EMBODIMENTS

The present invention discloses an unique automatic photography booth that employs a computerized video camera that can map out key characteristics of real-time and stored images and generate a novel sketch of the real-time and stored images. This computer generated synthesized sketch may be that of a real-time image or a blend of a sketch of one real-time image and a stored image. The subject-user has many choices in creating a single sketch, a multiplicity of the sketch or the sketch with a selected background sketch. A microprocessor blends, merges, superimposes the two images to create the sketch. Advanced embodiments would blend a multiplicity of sketches.

Figure 1:
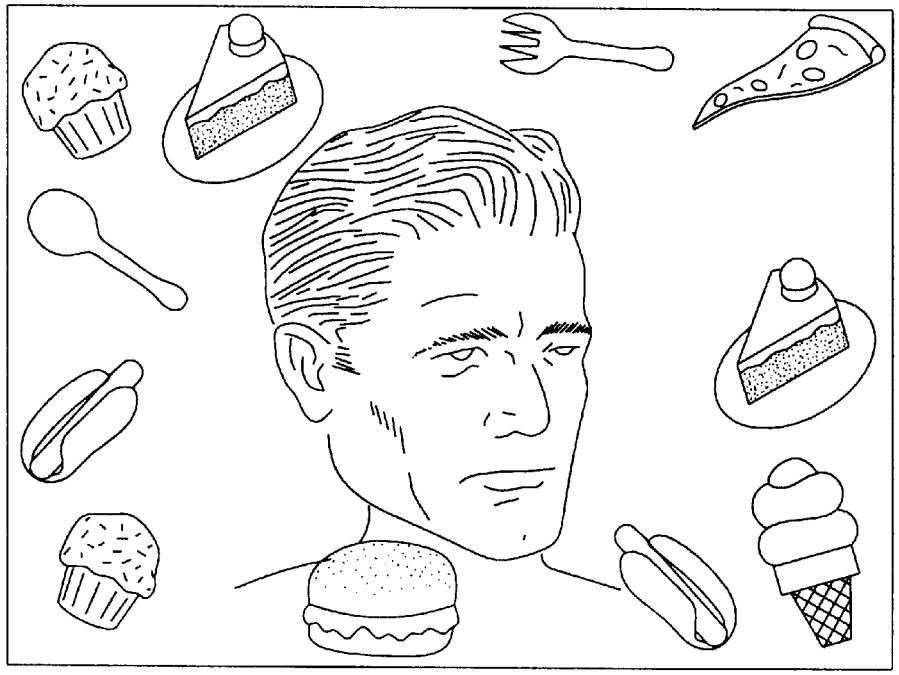
FIG. 1 is a single image sketch which can be produced by the automatic photography booth of the invention.

As shown in FIG. 1, a sketch is formed of a real-time image onto a substrate, for example, a post card or a sticker. Optionally, a sketched background can also be provided.

Figure 2:
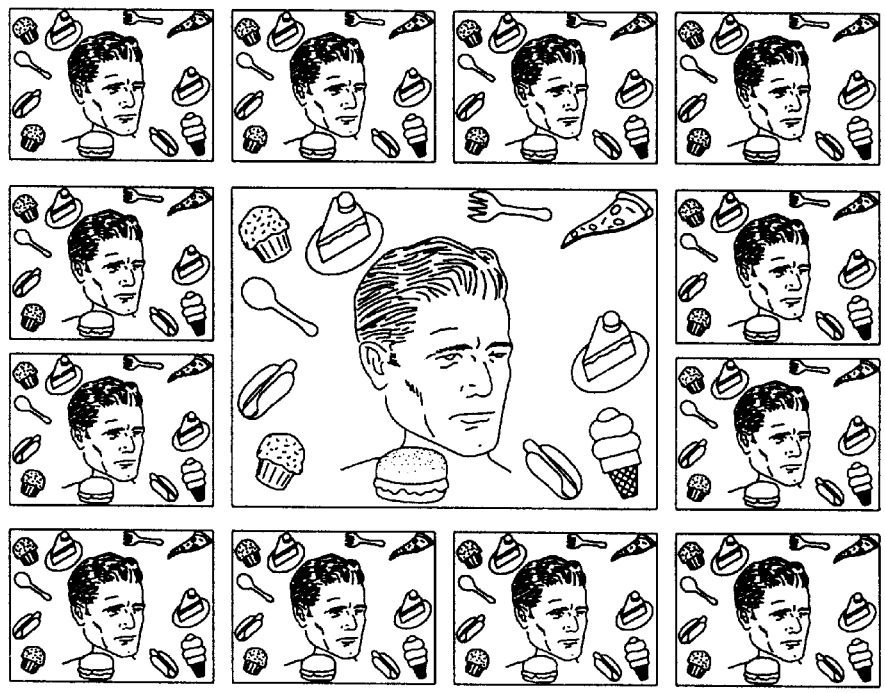
FIG. 2 is a card showing a multiplicity of the sketch of FIG. 1.

As shown in FIG. 2, a multiplicity of the sketch of FIG. 1 can be placed on a substrate. The multiplicity of sketches can be all of the same size or of different sizes as seen in the figure.

Suitable computer hardware which can be used is available from Panasonic Corporation of Japan as DSP Board No. CV-ME V507. Suitable software available from Kyugo Co. Ltd. as NIGARO 2 or Panasonic Corporation of Japan.

Figure 3:
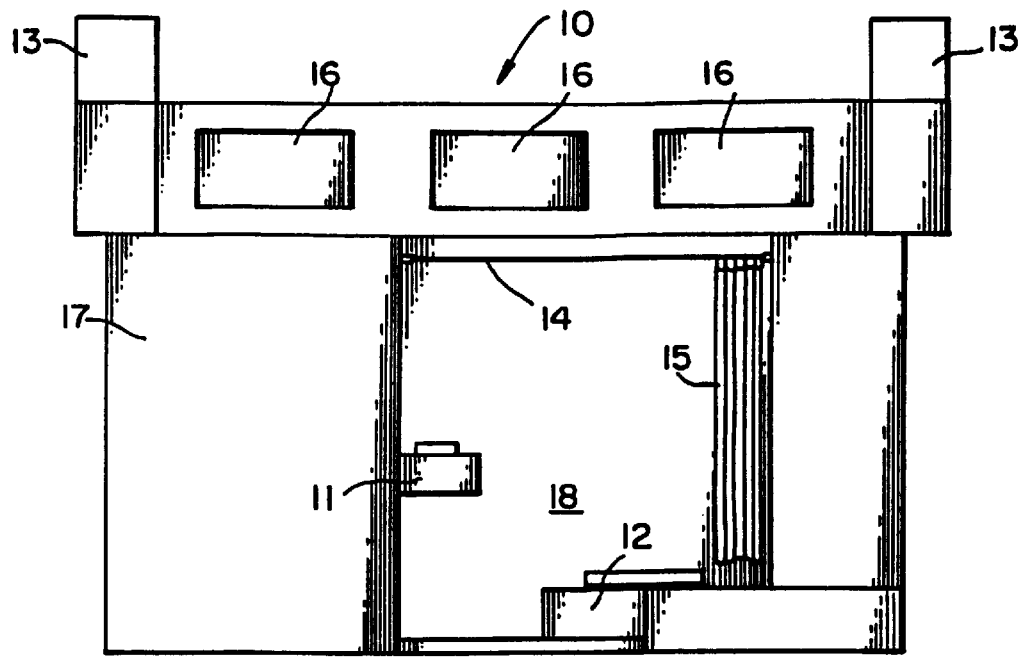
FIG. 3 shows a side view of the automatic photography booth taught by this invention.

Referring now to the drawings, FIG. 3 shows a side view of the microprocessor-aided automatic photography booth 10. The booth 10 includes a housing that is preferably integrally divided into an apparatus compartment 17 and an adjoining studio compartment 18. The studio compartment has at least one opening through which a subject-user may enter or leave the booth 10. While human beings are the obvious subject-users, it is contemplated that animals and things may also pose as the subject while a human being located nearby would act as the user who selects the game.

If privacy is desired, the opening is preferably covered by an opaque covering such as a moveable curtain 15 attached to a curtain rod 14 or some other like covering such as a door. Advantageously, sitting means, such as a seat 12, bench or other like piece of furniture is placed toward the front end of the studio compartment 18 for use by the subject-user to sit on during operation of the photographic functions. More advantageously, the seat 12 is in the form of a bench that extends transversely substantially along the entire width of the studio compartment 18. From the vantage point of the seat 12, the subject-user will directly face the control means 11, which is advantageously shaped in the form of a panel. Other preferable components depicted in FIG. 1 include a lighted marquee 16 for illumination of the booth and additional video display monitors 13 which are situated on top of or along the outside of the booth housing and are interconnected to a microprocessor 26 for viewing by nonsubject-users.

Figure 4:
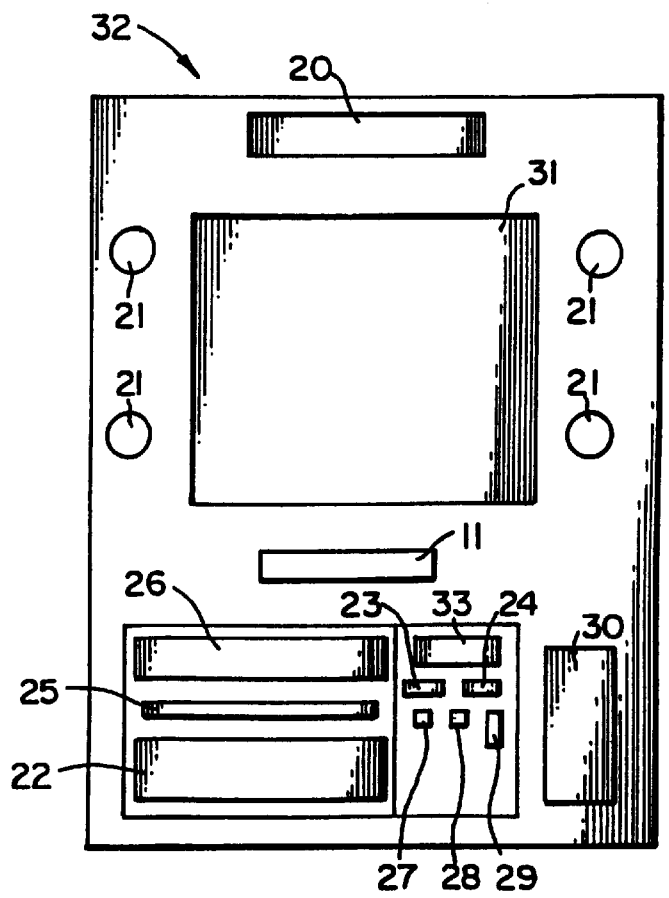
FIG. 4 shows a front view of the front panel of the booth of FIG. 3, which is the panel facing the subject-user after he or she enters the booth and sits down.
Figure 8:
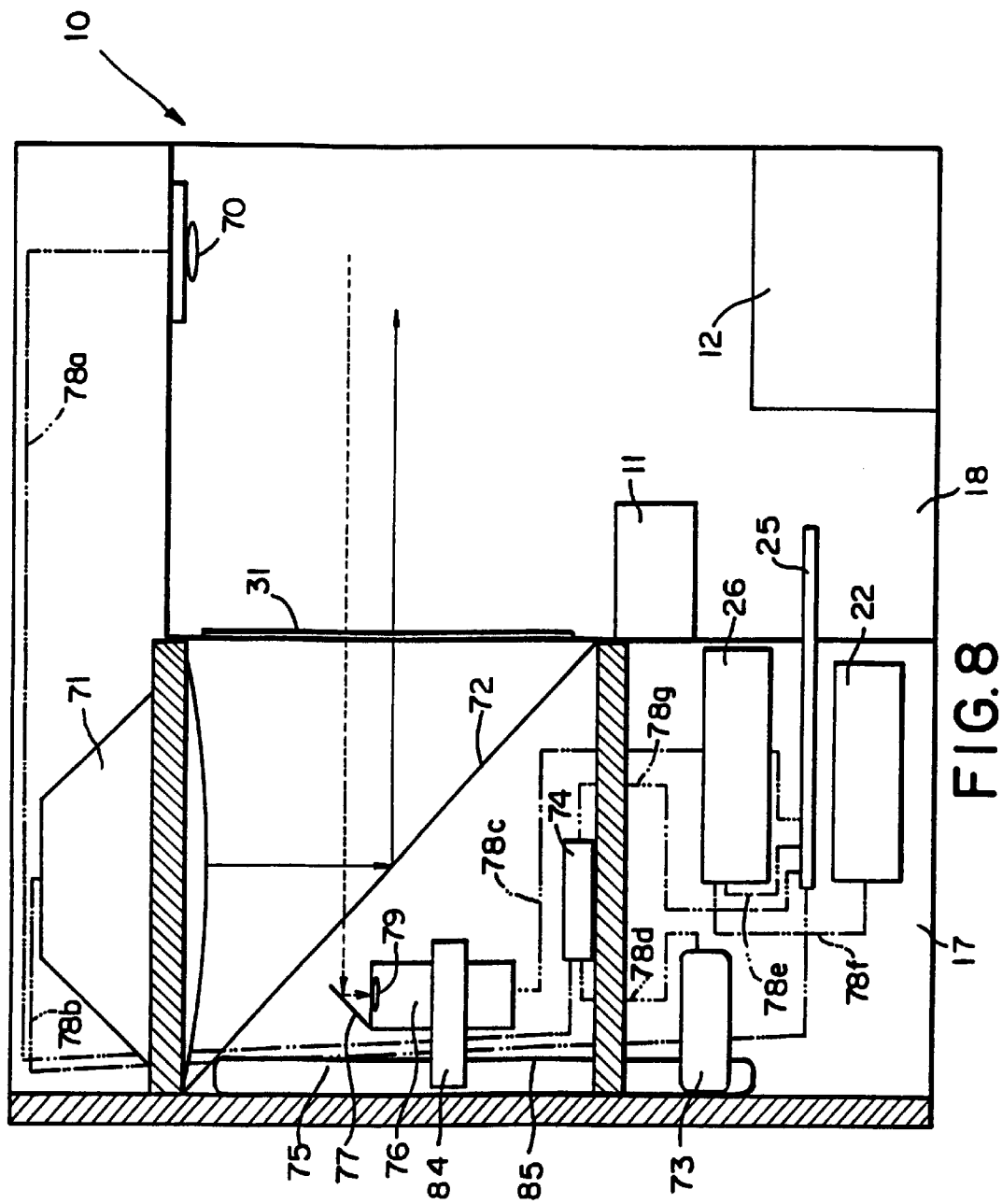
FIG. 8 shows another side view of the booth of FIG. 3 with portions broken away to illustrate the configuration of the apparatus and studio compartments.

FIG. 4 depicts a front panel 32 which runs along the interface between the apparatus compartment 17 and the studio compartment 18 of FIG. 3. The front panel 32 preferably contains a lighting means 20, most preferably a fluorescent lighting means, for illumination of the interior of the studio compartment 18. Approximately in the center of the front panel 32, and approximately at the eye level of the subject-user, is located a viewing screen or window 31 in which the subject-user may follow the progress of the game and in which instructions may be transmitted and received. Advantageously, the viewing screen 31 is surrounded by a multiplicity of lights 21 to further enhance visibility of the screen 31. Most preferably, a video display monitor 71 is positioned above an one way mirror 72 that reflects the signals and images toward the viewing screen 31 for viewing by the user. The mirror 72 is normally placed at an angle of 45°. FIG. 8 depicts that embodiment. The viewing screen 31 is preferably surrounded and covered by a transparent window.

The control means panel 11 of FIG. 3 is shown again in FIG. 4 as being located directly beneath the viewing screen 31, which facilitates easy access for the subject-user. Beneath the control means panel 11 are a computer/microprocessor 26, preferably, a main PC control board 25 which is interconnected to the microprocessor 26 for coordinating control of the operation of the booth 10 and means 22 for recording the captured images. The front panel 32 further includes actuating means, preferably, in the form of an opening, slot or pad, which allow a subject-user to start operation of the booth 10. Most preferably, the actuating means would include a coin and token meter slot 23, a bill acceptor 30 and a keypad or a magnetic stripe decoder 33 for entering an alpha-numeric access code that will automatically debit the account in consideration. Other forms which are acceptable include buttons, switches and the like.

A general power switch 29 is also located on the front panel 32. Another power switch may be placed elsewhere inside of the booth 10. The front panel 32 may include various other keys and switches such as a service meter 24, a service switch 28 and a self-test switch 27. Finally, a covering or door is generally provided to cover the microprocessor 26, the main PC control board 25, the recording and printing means 22 and the various switches 24, 27, 28 and 29 to prevent unauthorized access.

Figure 5:
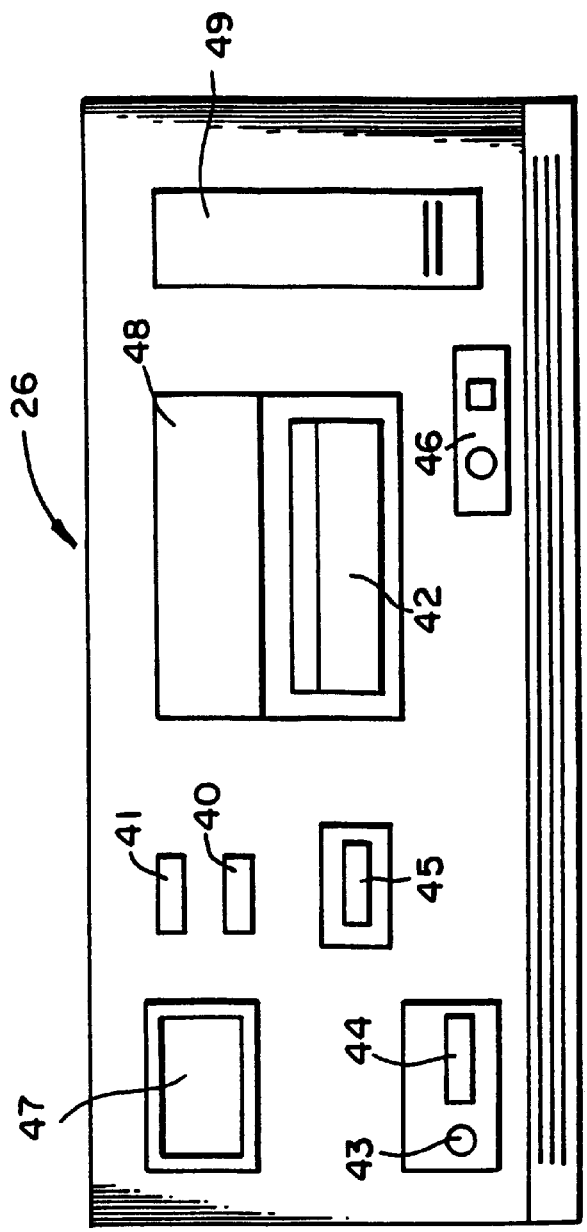
FIG. 5 shows a front view of the microprocessor of FIG. 4.

FIG. 5 depicts a front view of the microprocessor 26 of FIG. 4. Included on the panel of the microprocessor 26 are a power switch 46 for starting and shutting off the microprocessor 26, a reset switch 45 which provides a soft reboot of the underlying software programs, a volume knob or switch 44, a keyboard connector 43, floppy disk drives 42, a power source lamp 41 which signals when the power is on and a drive access lamp 40 which signals when the disk drive is being accessed. Other outlets, connectors, readouts, monitors, and the like 47, 48 and 49 may be added to the microprocessor 26 as needed.

Figure 6:
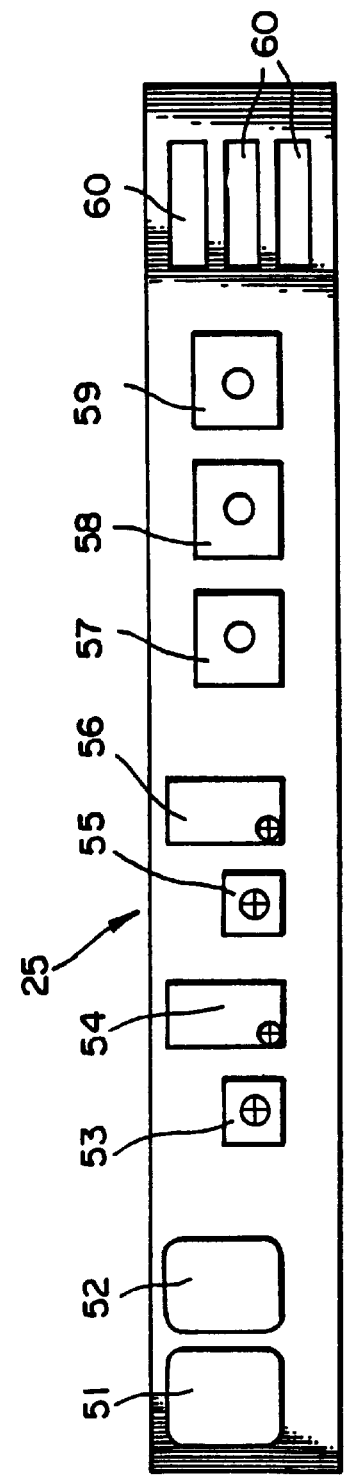
FIG. 6 shows a front view of the main personal computer control board of FIG. 4.

The main PC control board 25 of FIG. 4 is shown in an exploded form in FIG. 6. Located on the PC board 25 are a left side volume control knob 51, a right side volume control knob 52, a first camera adjustment switch 53, a voltage adjustment switch 54, a vibration adjustment switch 55, a second camera adjustment switch 56, a first camera height test switch 57, a second camera height test switch 58, a camera return switch 59 and a series of connector slots 60 such as a 8-pin connector.

Figure 7:
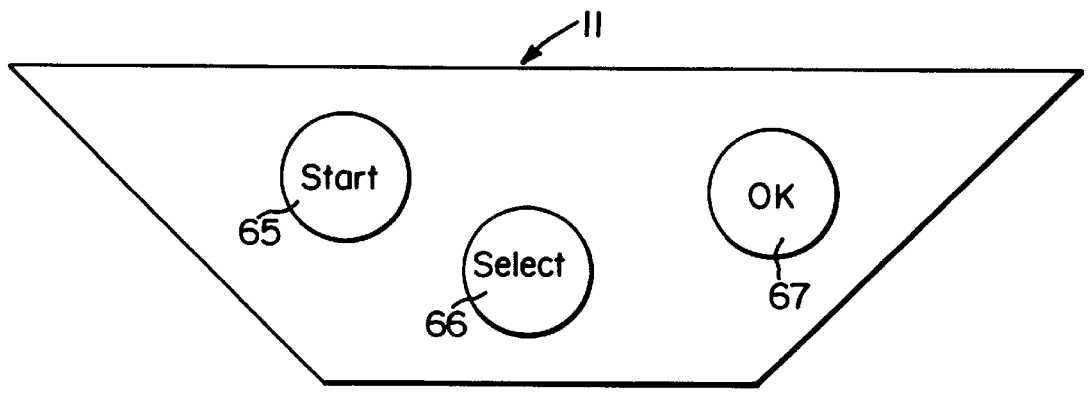
FIG. 7 shows a top view of the control panel means of FIG. 3 and FIG. 4.

FIG. 7 depicts an exploded view of the control means panel 11 of FIG. 3 and FIG. 4. The panel 11 is located in the studio compartment 18 and is operably connected to the microprocessor 26 so that the subject-user may control operation of the booth 10. Preferably, the panel 11 consists of at least three button switches—one button 65 labelled "START" for beginning play of a game or an operation of a particular type, a second button 66 labelled "SELECT" for highlighting on the viewing screen 31 an icon of the game the subject-user chooses to play, and a third button 67 labelled "OK" for verifying and finalizing the choice of the subject-user and automatically prompting the next menu of instructions or commands on the viewing screen 31. The subject-user continues to "SELECT" and "OK" his commands as the microprocessor 26 leads him or her through the game.

FIG. 8 shows a cut-out side view of the entire booth 10. The studio compartment 18 is to the right and contains the seat 12, the control means panel 11, the viewing screen 31 and an ultrasonic sensor 70. The sensor 70 senses and transmits the location of the subject-user to the microprocessor 26, which initiates automatic adjustment of the position of a moving camera 76 so as to obtain a correct sight of the subject-user. This automatic positioning means enables the resulting sketch to be centered.

The bottom half of the apparatus compartment 17, which sits to the left, contains the recording and printing means 22, the main PC control board 25 and the microprocessor 26. The top half of the apparatus compartment 17 contains the moving camera 76 and a video display monitor 71 which is associated with the camera 76 and interconnected to the microprocessor 26 for visual representation of all instructions, commands and images and for directing the alignment of the camera 76 in relation to the subject-user. The camera 76 is preferably held in a camera holder 84 which is movably connected to the booth 10 via a support column or rod 85. The camera 76 is preferably a video camera and generally includes a camera housing, multiple frame photographic film, auto-focus lens means 79, auto-exposure shutter means, auto-film wind means and circuitry means for operating the camera 76. Most preferably, the camera 76 includes an electronic eye (not shown) which can measure the distance between the eyes of the subject-user.

Further included in the apparatus compartment 17 is an one way mirror 72, which is preferably located substantially along the entire length of the diagonal running from the top left to the bottom right of the top half of the apparatus compartment 17. Advantageously, the video monitor 71 is situated at the top of the booth facing down toward the ground so that the signals transmitted by the monitor 71 fall upon the one way mirror 72 at approximately a 45° angle and transmit through to the viewing screen 31 at an optimum angle of 90°.

Also included in the apparatus compartment 17 is another, much smaller mirror 77 which is preferably fixedly attached to the camera 76 so as to direct the signals received from the subject-user into the lens 79 of the camera 76. Preferably, the camera 76 is facing directly upwards towards the video monitor 71 and the small mirror 77 is positioned at approximately a 45° angle to the line of the camera 76. The camera 76 and small mirror 77 are so oriented for reflecting the user's image down into the camera lens 79. Since the camera 76 is positioned behind the large one way mirror 72, the camera 76 can see the user, but the user cannot see the camera 76.

A preferred camera adjusting means would include the ultrasonic sensor 70 in the studio compartment 18, and in the apparatus compartment 17, a robot arm 75, an actuator board 74, a step motor 73 and a series of cables 78a, b, c, d, e, f and g for connecting all of the apparatus parts together. Following FIG. 8 in a counter-clockwise direction starting from the top right, one sees: the cable 78a from the ultrasonic sensor 70 to the actuator board 74; the cable 78b from the video monitor 71 to the main PC control board 25; the cable 78c from the camera 76 to the main board 25; the cable 78d from the actuator board 74 to the step motor 73; the cable 78e from the main board 25 to the microprocessor 26; the cable 78f from the microprocessor 26 to the recorder and one or more printer means 22; and the cable 78g from the actuator board 74 to the main board 25.

When the subject-user enters the booth 10 and sits on the seat 12, it automatically activates the camera adjusting means to obtain a correct sight of the user. The sensor 70, located directly above the seat 12, gauges the location of the user's head and sends a signal to the actuator board 74. The actuator board 74, which is interconnected to the microprocessor 26, then activates a camera pivoting means located on the camera 76 or camera housing which uses an eye reference until the correct sight of the user is obtained. Preferably, the pivoting means consist of the step motor 73 and the robot arm 75. The robot arm 75 and camera 76 are positioned behind the large one way mirror 72. The actuator board 74 sends a signal to the step motor 73 which activates the robot arm 75. The robot arm 75 then moves the camera 76 to the proper height for taking the user's picture.

The camera adjusting means preferably includes a camera mounting and means for pivoting the camera 76 on a vertical axis to provide a horizontal field of view adjustment. More preferably, the pivoting means is also operable on a horizontal axis to provide a vertical field of view adjustment. Advantageously, the camera mounting provides translational camera movement. More advantageously, the camera adjusting means includes a steering mechanism that provides translational and rotational camera movement. The combination of the sensor 70, moving camera 76 and cables and parts as described above minimizes the need of the subject-user to properly sit in a certain zone and accounts for all different sized users. Once a user sits on the seat 12, the system will automatically center the picture.

Figure 9:
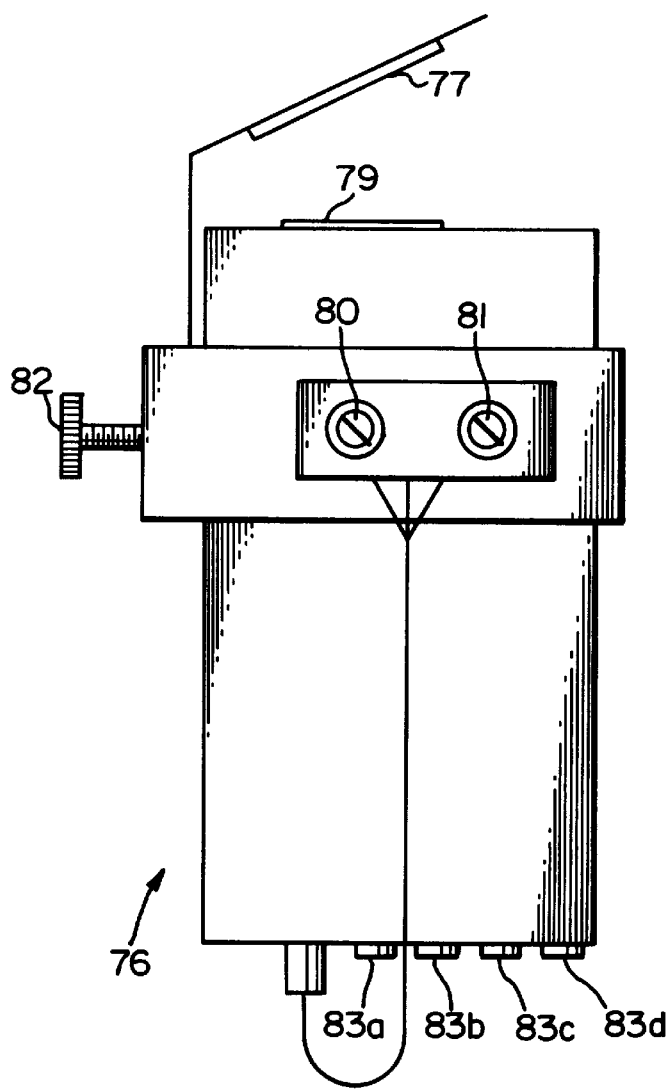
FIG. 9 shows an exploded view of the camera of FIG. 8.

FIG. 9 shows a side view of the camera 76 and the small mirror 77 fixedly attached to the camera 76 at an angle of approximately 45°. Situated on the camera are a series of button switches and/or knobs for adjusting the lightness/darkness 80, the color tint 81, the small mirror 77, the autofocus lens 83a, the zoom telescope lens 83b, the zoom wide angle lens 83c, and the camera program control 83d. A video printer is the preferable choice for the recording and printing means 22. The video printer 22 preferably has two trays, one for post cards and the other for stickers, all concealed behind a compartment door.

Figure 10:
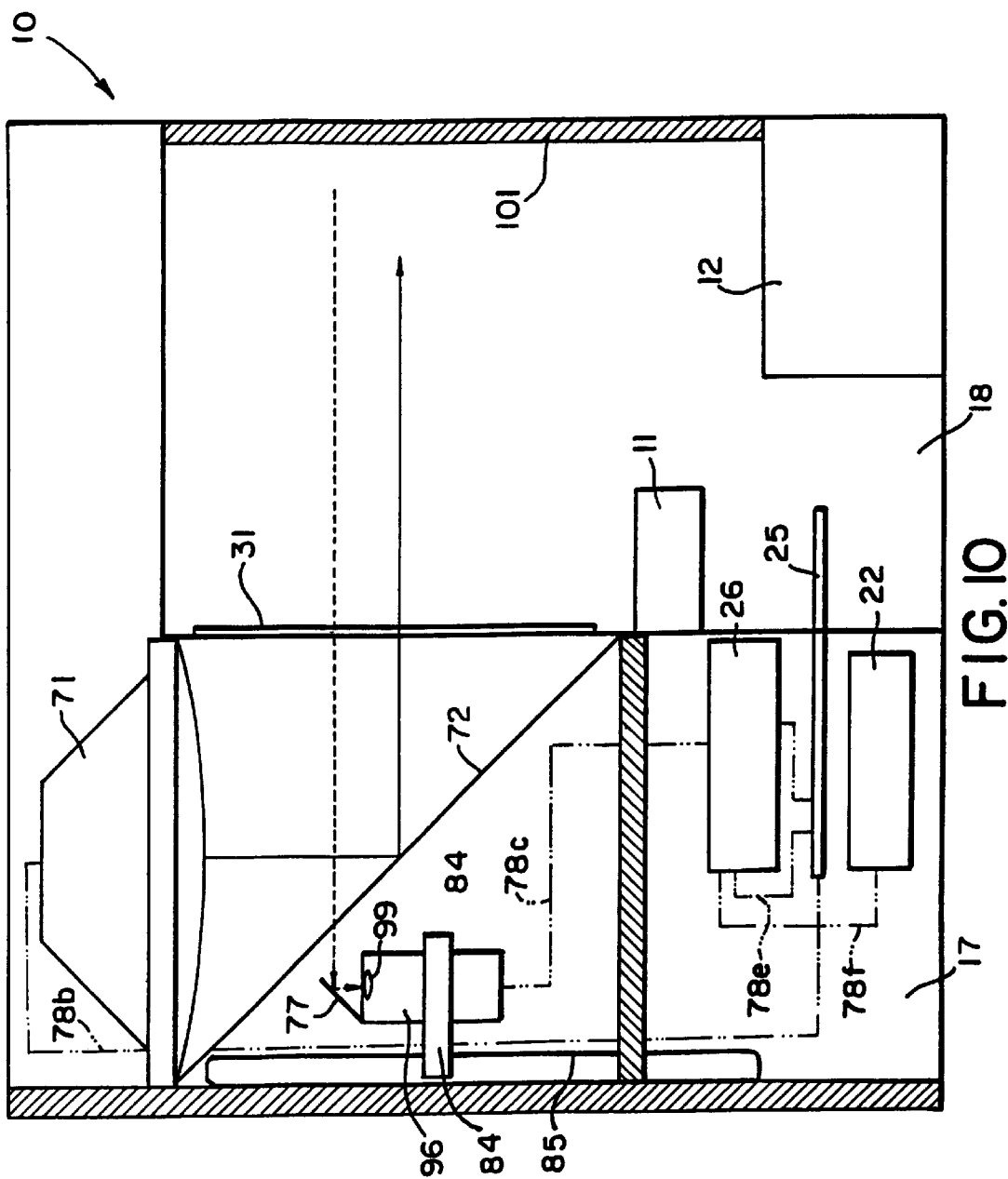
FIG. 10 shows another embodiment of the invention shown in FIG. 8 utilizing a different camera and cable system.

FIG. 10 shows another embodiment of the present invention in which a stationary camera 96, rather than the moving camera 76, is employed. The stationary camera 96 is equipped with a wide-angled lens 99 mounted thereon which can view substantially the entire width which forms a back wall 101 of the studio compartment 18 and which utilizes a software program to center the composite image in a picture frame. The seat 12 is preferably located toward the front end of and parallel to the back wall 101 of the studio compartment 18. As with the moving camera 76, the stationary camera 96 utilizes the smaller one way mirror 77 to direct the signals received from the subject-user into the lens 99 of the stationary camera 96. The stationary camera 96 is also similarly positioned behind the larger one way mirror 72 running diagonally in the top half of the apparatus compartment 17. The stationary camera 96 is held in the camera holder 84 which is fixedly attached to the support column or rod 85 situated in the booth 10. Finally, the stationary camera 96 is connected to the main board through use of the cable 78c.

The automatic positioning means operates as follows. A second software program is kept in the memory of the microprocessor 26. The back wall 101 of the studio compartment 18 is colored, preferably, in blue or green. When a subject-user enters the booth 10 and initiates the stationary camera 96 system, a picture is taken and the second software program detects where the colored back wall 101 is missing due to the presence of the subject-user. It then subtracts out all of the color emitting from the back wall 101 and determines the exact position of the subject-user. Then, it centers the resulting composite image in a picture frame. Thus, this system eliminates the need of the subject-user to properly sit in a certain zone as well as accounting for all sizes of users. In fact, the user can sit or stand almost anywhere along the back wall 101 and the resulting picture will be centered.

The stationary camera and software system views substantially the entire back wall 101 bit by bit, subtracting out the color until a body and a head of the subject-user is outlined and formed into a sketch. The resulting sketch is accurately centered each time in a picture frame. The distance between the top of the composite head and the top of the picture frame is the same for each subject-user no matter where the subject-user sits or stands along the back wall 101 or what option is selected.

Most advantageously, the stationary camera 96 takes the picture to form a picture frame for the sketch and transmits this information to the second software program in the microprocessor 26 where the sketch is fine-tuned. First, the software program scans from the top of the picture frame down until it hits the head of the subject-user. Then, it scans from the top of the head until it finds the eyes of the subject-user and centers the eyes inside the picture frame. This insures that every sketch can be properly centered inside the picture frame giving the results consistency and reproducability. Once the eyes are found, the rest of the features of the subject-user are easier to locate, which entails less scanning and makes the entire process more accurate, faster and cheaper. Last, the software program centers the subject-user in the picture frame based on the prior centering of the eyes.

This new stationary camera 96 and software system feature eliminates many problems associated with the moving camera 76 and other prior art devices. There is no need for the subject-user to move and sit in the proper spot. There is no adjustable height seat. The stationary camera 96 can accommodate any sized subject-user so long as he or she can fit inside of the studio compartment 18 and in front of part of the back wall 101. Furthermore, the computer can more quickly and accurately center and focus the subject-user in a picture frame than could previous prior art systems. Moreover, there are less moving parts with which to deal and this results in ease of use, less cost, less repairs and less down time. The moving camera 76 required the sensor 70, the actuator board 74, the robot arm 75, the step motor 73 and all of the cables 78a, 78d and 78g connecting those parts. In addition, the sensor 70 is a delicate instrument which is expensive, is not always accurate, sometimes does not work and is prone to be faulty or broken. The stationary camera 96 eliminates these problems and provides a faster, cheaper and simpler and more encompassing system which is also more reliable and accurate than previous moving camera 76 systems.

Looking at the microprocessor 26, it can be seen from the drawings that it is interconnected to all of the elements of the booth including the circuitry means of the camera 76 or 96. Thus, the microprocessor 26 controls and operates all of the photographic functions and receives in its memory a real-time image of each subject-user. The memory of the microprocessor 26 also contains a plurality of stored images and at least one software program for converting the images into a computer synthesized sketch.

Advantageously, the stored images held in the memory of the microprocessor 26 consist of sketched geographical sights, animals, humans and works of art. The software program consists of at least two different subprograms. The first subprogram includes means for converting the real-time image into a sketch. The second subprogram includes means for converting the real-time image and at least one of the other sketched images into a composite.

Now that all of the essential elements of the present invention have been identified, it can be appreciated how the system works. The booth 10 is turned on by a vendor. The subject-user enters the booth 10 and sits on the seat 12. The user is now facing the viewing screen 31 and control panel 11. When the machine is started, it automatically enters a DEMO Mode which runs a continuous brief demonstration of the various games or operations offered by the booth 10. Thus, the user has a chance to learn what the apparatus is capable of doing before selecting a particular game or operation. The demonstrations will alternate with a message to the user to insert money in order to begin play.

When the subject-user inserts the money, the "START" button 65 begins to flash. The user presses the "START" button 65 and a Main Menu will appear on the screen. Throughout the entire process, the apparatus gives both audio and visual instructions. All interactions with the microprocessor 26 takes place through the process of making selections from on screen menus. The user chooses the images to be captured on the microprocessor 26 and selects the proper buttons to record and print the computerized sketched.

It can therefore be seen that the invention embodies a method of automatically taking, processing and delivering a sketch of a subject-user in response to the user actuating controls in a photobooth where the user poses. The method includes electronically forming in response to a signal activated by the user a first electronically facial imaging information representative of the user posed in the booth. The first electronically imaging information is then further processed by forming a second electronic image which is a sketch of the real image.

Optionally, a sketched image is generated for the background of the sketched real-time image. The sketched images are then electronically combined to produce a composite. The sketched composite image is then printed out by one or more conventional printer.

The microprocessor can also be programmed to provide a single sketch or a multiplicity of the same sketch to be placed either on a card substrate or a sticker substrate.

Although the invention has been described with reference to certain preferred embodiments, it will be appreciated that many variations and modifications may be made within the scope of the broad principles of the invention. For example, in the photography field, this invention can be used as a game or as an informational tool for social or legal matters, legal enforcement or insurance purposes, scientific investigations and the like. Hence, it is intended that the preferred embodiments and all of such variations and modifications be included within the scope and spirit of the invention, as defined by the following claims.

What is claimed is:

1. An automatic photography booth which contains a microprocessor, said booth comprising:
    (a) a housing comprising an apparatus compartment and an adjoining studio compartment, said studio compartment having at least one opening for providing ingress and egress therein;
    (b) a video camera mounted within said housing for receiving at least one real-time image of at least one subject-user, said camera having circuitry connected to said microprocessor for operating the photographic functions thereof and for receiving said real-time image, said microprocessor containing a memory having a plurality of stored images and a software program for converting at least one real-time image into a sketched image;
    (c) means for automatically positioning a real-time image of said subject-user inside a lens of said camera;
    (d) actuating means positioned in said studio compartment for enabling said subject-user to start operation of said booth; and
    (e) control means positioned in said studio compartment and operably connected to said microprocessor for enabling said subject-user to control operation thereof, said control means being adapted for actuation by said subject-user to select one or more of said stored images for display on said monitor and to effect operation of said camera to focus upon said subject-user to obtain said real-time image, said control means being further adapted upon the command of said subject-user to fix the selected real-time image and to effect operation of said microprocessor to produce a composite sketch.

2. The booth of claim 1 further including:
    means for instructing said subject-user as to the manner and sequence in which said control means are actuable;
    means for informing said subject-user as to when said sketched image is to be captured;
    means for recording and printing said sketched image; and
    a main control board interconnected to said microprocessor for coordinating control of the operation of said booth.

3. The booth according to claim 2, wherein said recording and printing means comprise a video printer interconnected to said microprocessor, said printer having at least one paper tray and paper.

4. The booth according to claim 1, wherein said stored image comprises a sketched image selected from the group consisting of geographical sights, animals, humans, and works of art.

5. An automatic photography booth which contains a microprocessor, said booth comprising:

(a) a housing comprising an apparatus compartment and an adjoining studio compartment, said studio compartment having at least one opening for providing ingress and egress therein;

(b) a video camera mounted within said housing for receiving at least one real-time image of at least one subject-user, said camera having circuitry connected to said microprocessor for operating the photographic functions thereof and for receiving said real-time image, said microprocessor containing a memory having a plurality of stored images and a software program for converting at least one real-time image into a sketched image, said software program comprising at least two subprograms, one program including means for converting said real-time image into said sketched image, a further program includes means for converting said real-time image and sketched background sight images into a composite sketched image;

(c) means for automatically positioning a real-time image of said subject-user inside a lens of said camera;

(d) actuating means positioned in said studio compartment for enabling said subject-user to start operation of said booth; and (e) control means positioned in said studio compartment and operably connected to said microprocessor for enabling said subject-user to control operation thereof, said control means being adapted for actuation by said subject-user to select one or more of said stored images for display on said monitor and to effect operation of said camera to focus upon said subject-user to obtain said real-time image, said control means being further adapted upon the command of said subject-user to fix the selected real-time image and to effect operation of said microprocessor to produce a sketch of said real-time image.

* * * * *